May 13, 1958　　　J. W. SEELEY　　　2,834,601

LIQUID TANK STRUCTURE FOR ROAD GRADERS

Filed April 15, 1957

Inventor
JOHN WILMOT SEELEY by: J. Richard Cavanagh
Patent Agent

United States Patent Office 2,834,601
Patented May 13, 1958

2,834,601

LIQUID TANK STRUCTURE FOR ROAD GRADERS

John Wilmot Seeley, Dundalk, Ontario, Canada

Application April 15, 1957, Serial No. 652,824

3 Claims. (Cl. 280—5)

This invention relates to a liquid tank structure adapted to be utilized as an attachment for road graders and the like.

The high cost of spraying the shoulders and ditches along a road for weed control has rendered such service substantially unavailable to many rural areas. Any kind of spraying equipment for use in conjunction with road protection, preparation or weed control has been carried in the past by a vehicle making a special trip for such spraying operation.

The maintenance of rural roadways requires regular grading thereof by various types of grading machinery. According to the present invention a liquid tank is provided in a structural form adapted for attachment to a road grader or the like of such structural features that it is capable of being mounted on a variety of road maintenance equipment all of which embody a drive motor having a coolant radiator at one end of the frame thereof.

It is, therefor, the main object of the present invention to provide a liquid tank structure adapted for attachment to the frame of road maintenance equipment and embodying attachment means defining an opening through the structure through which coolant air may pass to the drive motor for the equipment.

With these and other objects in view the invention generally comprises a tank in the form of outer walls and inner walls in the said tank defining an opening therethrough and means projecting from said inner walls adapted for attachment to the frame of road maintenance equipment, and defining a coolant air conducting opening for the drive motor of said equipment.

Other objects of the invention will be apparent from study of the following specification taken in conjunction with the accompanying drawings.

Figure 1:
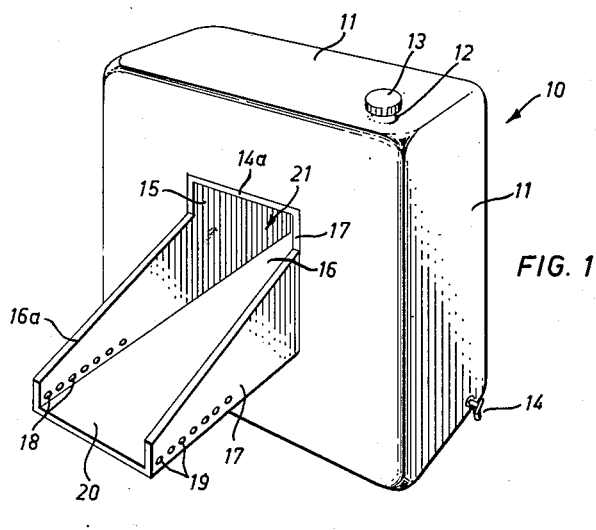
Figure 1 is a perspective view of a preferred form of the invention.

In the drawings the tank structure 10 of the invention is shown in Figure 1 and comprises a plurality of outer walls 11 of any suitable configuration defining an enclosure and having a liquid inlet 12 and suitable removable cap 13 therefor. A number of outlets may be provided such as in the form of the spigot 14 from which the contents of the tank may be drained.

The tank of the invention also comprises a plurality of inner walls 14a, 15, 16 and 17 defining an opening through the tank substantially axially thereof and adapted to communicate coolant air therethrough. In particular, however, the invention concerns the combination with said inner walls of attachment means extending therefrom provided, for example, in the form of the outwardly extending arms 16a and 17 forming a part or projection of the inner walls 15 and 17 and having therein a series of bolt holes 18 and 19 respectively. Preferably the mounting arms 16a and 17 are reinforced against twisting by the rigidifying web 20 forming a corresponding outward projection of the inner wall 16.

Figure 2:
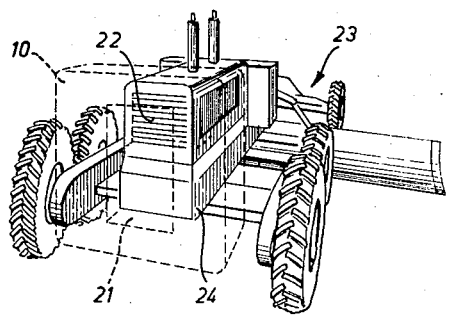
Figure 2 is a perspective view of one kind of road grading equipment adapted to carry the tank structure of the invention and showing the latter in dotted lines mounted therein.

The tank structure shown in Figure 1 is preferably fabricated by welding of sheet metal to provide a rigid tank structure adapted for attachment to a variety of road maintenance equipment to provide a liquid reservoir thereon of various utility. The air communicating opening 21 provided by the inner walls is adapted to be substantially aligned with the radiator 22 of road maintenance apparatus such as the grading apparatus 23 of Figure 2. In this connection the arms 16a and 17 are bolted to the frame 24 or otherwise fastened in any suitable manner enabling attachment and removal of the tank structure of the invention as desired.

The tank structure of the invention enables a 1000 gallon liquid reservoir to be attached at will to road maintenance equipment for use in a variety of liquid spraying applications which may be accomplished during road maintenance thereby substantially reducing the cost of spraying operations as compared with providing for spraying by use of a separate vehicle.

It is intended that the present disclosure should not be construed in any limiting sense other than that defined by the scope of the following claims.

What I claim as my invention is:

1. A liquid tank attachment structure for road grading equipment and the like having a drive motor radiator at one end supported on the frame thereof, and comprising in combination: a plurality of outer walls defining a tank enclosure; a plurality of inner walls defining an opening through said tank; and supporting means extending from said inner walls for attachment to the said frame and disposing the opening of said structure substantially in alignment with said radiator for communication of coolant air thereto.

2. A liquid tank attachment structure for road grading equipment and the like having a drive motor radiator at one end supported on the frame thereof, and comprising in combination: a plurality of outer walls defining a tank enclosure; a plurality of inner walls defining an opening through said tank; and support means extending from said inner walls for attachment to the said frame and disposing the opening of said structure substantially in alignment with said radiator for communication of coolant air thereto, said projecting means forming a continuation of certain of said inner walls.

3. A liquid tank attachment structure for road grading equipment and the like having a drive motor radiator at one end supported on the frame thereof, and comprising in combination: a plurality of outer walls defining a tank enclosure; a plurality of inner walls defining an opening through said tank; support means extending from said inner walls for attachment to the said frame and disposing the opening of said structure substantially in alignment with said radiator for communication of coolant air thereto, said projecting means forming a continuation of certain of said inner walls; and means extending from another of said inner walls for rigidifying said projecting means.

References Cited in the file of this patent

UNITED STATES PATENTS

| | | |
|---|---|---|
| 2,296,859 | LeTourneau | Sept. 29, 1942 |
| 2,530,819 | Hamlin | Nov. 21, 1950 |

FOREIGN PATENTS

| | | |
|---|---|---|
| 23,852 | Australia | Nov. 27, 1929 |